US012065000B2

(12) United States Patent
He

(10) Patent No.: US 12,065,000 B2
(45) Date of Patent: Aug. 20, 2024

(54) EXPLOSION-PROOF TIRE HUB, EXPLOSION-PROOF TIRE, AND MOVING TOOL

(71) Applicant: Ruzhao He, Qingyuan (CN)

(72) Inventor: Ruzhao He, Qingyuan (CN)

( * ) Notice: Subject to any disclaimer, the term of this patent is extended or adjusted under 35 U.S.C. 154(b) by 443 days.

(21) Appl. No.: 17/359,676

(22) Filed: Jun. 28, 2021

(65) Prior Publication Data
US 2021/0323360 A1    Oct. 21, 2021

Related U.S. Application Data

(63) Continuation-in-part of application No. PCT/CN2019/076418, filed on Feb. 28, 2019.

(51) Int. Cl.
| | |
|---|---|
| *B60C 5/20* | (2006.01) |
| *B60B 3/08* | (2006.01) |
| *B60B 21/02* | (2006.01) |
| *B60B 21/10* | (2006.01) |
| *B60C 5/02* | (2006.01) |
| *B60C 17/04* | (2006.01) |
| *B60C 17/06* | (2006.01) |

(52) U.S. Cl.
CPC .............. *B60C 17/06* (2013.01); *B60B 3/087* (2013.01); *B60B 21/026* (2013.01); *B60B 21/102* (2013.01); *B60B 21/104* (2013.01); *B60C 5/02* (2013.01)

(58) Field of Classification Search
CPC .. B60C 5/02; B60C 5/025; B60C 5/04; B60C 5/08; B60C 5/10; B60C 17/041; B60C 17/042
See application file for complete search history.

(56) References Cited

U.S. PATENT DOCUMENTS 4,641,670 A    2/1987 Poque et al.

FOREIGN PATENT DOCUMENTS

| CN | 1130576 A | 9/1996 |
| CN | 2705325 Y | 6/2005 |
| | (Continued) | |

OTHER PUBLICATIONS

International Search Report issued in corresponding International application No. PCT/CN2019/076418, mailed Dec. 5, 2019 (8 pages).

(Continued)

*Primary Examiner* — Justin R Fischer

(57) ABSTRACT

Disclosed are an explosion-proof tire hub, including a hub body and an explosion-proof convex retainer. The hub body includes bent portions configured to mount a vacuum tire, the hub body is provided with a central axis, the explosion-proof convex retainer is fixed on the hub body, the distance between an upper end of the explosion-proof convex retainer and the central axis is L1, the distance between an upper end of the bent portion and the central axis is L2, and L1 is greater than L2. In case of burst or instantaneous pressure loss, because the distance L1 between the upper end of the explosion-proof convex retainer and the central axis is greater than the distance L2 between the upper end of the bent portion and the central axis, the explosion-proof convex retainer reduces the distance between the whole hub and the ground during tire burst and improves safety performance.

9 Claims, 4 Drawing Sheets

(56) References Cited

FOREIGN PATENT DOCUMENTS

| | | | |
|---|---|---|---|
| CN | 202180715 | | 4/2012 |
| CN | 109397997 A | | 3/2019 |
| CN | 209274284 U | | 8/2019 |
| DE | 19839484 | * | 3/2000 |
| FR | 2617097 B1 | | 5/1990 |
| JP | 2013-126870 | * | 6/2013 |
| WO | WO 84/01545 | * | 4/1987 |

OTHER PUBLICATIONS

Written Opinion of the International Searching Authority for No. PCT/CN2019/076418.

* cited by examiner

EXPLOSION-PROOF TIRE HUB, EXPLOSION-PROOF TIRE, AND MOVING TOOL

TECHNICAL FIELD

The present invention relates to the field of tires, and in particular, to an explosion-proof tire hub, an explosion-proof tire, and a moving tool.

BACKGROUND

At present, with the improvement of living standards, more and more vehicles are used in people's daily life, which facilitates people's travel and work.

However, the existing vehicle hub has the following disadvantages:

When the hub in the market is in use, during the running of moving tools such as a vehicle and an airplane on the ground, tire burst or instantaneous pressure loss causes braking deviation or deviation of the airplane or the vehicle, which will result in serious accidents caused by braking failure and directly threaten the safety of people's lives and property, with low safety performance.

SUMMARY

To overcome the disadvantages of the prior art, an object of the present invention is to provide an explosion-proof tire hub, which can resolve the problem of low safety performance.

The first object of the present invention is implemented by adopting the following technical solution:

An explosion-proof tire hub is provided, including a hub body and an explosion-proof convex retainer, where the hub body includes bent portions that are distributed on both sides of the hub body and configured to mount a vacuum tire, the hub body is provided with a central axis, the explosion-proof convex retainer is fixed on the hub body, the distance between an upper end of the explosion-proof convex retainer and the central axis is L1, the distance between an upper end of the bent portion and the central axis is L2, and L1 is greater than L2.

Further, the explosion-proof convex retainer is located at a middle portion of the hub body and between the bent portions, the cross section of the explosion-proof convex retainer includes a contact portion located outside and an arc-shaped portion located inside, the arc-shaped portion is connected to the contact portion, and the lowermost end of the arc-shaped portion is fixed to the middle portion of the hub body.

Further, the bent portions are symmetrically distributed relative to the explosion-proof convex retainer, the bent portions and the explosion-proof convex retainer are arranged around the hub body, the central axis coincides with axes of the bent portion and the explosion-proof convex retainer, and a lower portion of the arc-shaped portion forms a mounting gap with the hub body.

Further, the explosion-proof convex retainer is hollow and is provided with vent holes, the vent holes enable the inside of the explosion-proof convex retainer to be communicated with an inner cavity of the vacuum tire, ribs are arranged on both sides of the explosion-proof convex retainer, and the ribs on both sides and the hub body are distributed in a triangle shape.

Further, the vent holes pass through the explosion-proof convex retainer, and are formed in the explosion-proof convex retainer in a surrounding manner, and the distance between the vent hole and the central axis is greater than the diameter of the hub body.

Further, the explosion-proof convex retainer includes an elastic component, the elastic component is located at an end of the explosion-proof convex retainer, and the distance between the elastic component and the central axis is L1.

Further, the explosion-proof convex retainer is further provided with a mounting groove, the elastic component is fixed in the mounting groove, the cross section of the mounting groove and the elastic component are trapezoidal, the thickness of the elastic component is greater than the depth of the mounting groove, and the cross section of the elastic component is parallel to the cross section of the vacuum tire.

An explosion-proof tire includes a hub body, a vacuum tire, and an explosion-proof convex retainer, where the hub body includes bent portions that are distributed on both sides of the hub body, the vacuum tire is mounted on the bent portions, the hub body is provided with a central axis, the explosion-proof convex retainer is fixed on the hub body, the distance between an upper end of the explosion-proof convex retainer and the central axis is L1, the distance between an upper end of the bent portion and the central axis is L2, and L1 is greater than L2.

Further, the explosion-proof convex retainer is hollow and is provided with vent holes, and the vent holes enable the inside of the explosion-proof convex retainer to be communicated with an inner cavity of the vacuum tire.

Further, the vent holes are circular holes.

The explosion-proof convex retainer is further provided with a mounting groove, an elastic component is fixed in the mounting groove, the vent holes are distributed in the explosion-proof convex retainer in a penetrating manner, and axes of the vent holes are parallel to the elastic component; and the hub body is located at inner sides of several vent holes.

A moving tool includes the above explosion-proof tire hub or the above explosion-proof tire.

Compared with the prior art, the present invention has the following beneficial effects:

The hub body is provided with the central axis, the explosion-proof convex retainer is fixed on the hub body, the distance between an upper end of the explosion-proof convex retainer and the central axis is L1, the distance between an upper end of the bent portion and the central axis is L2, and L1 is greater than L2. In case of burst or instantaneous pressure loss during running of means of transportation such as an airplane and a vehicle, because the distance L1 between the upper end of the explosion-proof convex retainer and the central axis is greater than the distance L2 between the upper end of the bent portion and the central axis, the explosion-proof convex retainer reduces the distance between the whole hub and the ground during tire burst; that is, the explosion-proof convex retainer smoothly replaces a tire cover of the tire to be in direct contact with the ground, which improves safety performance, effectively reduces impacts of braking deviation, deviation, braking and the like, and greatly reduces primary and secondary accidents.

The description above is only summary of the technical solutions of the present invention. To help understand the technical means of the present invention more clearly for implementation according to the content of the specification, and to make the above and other objects, features and advantages of the present invention more apparent and easy to understand, preferred embodiments are especially taken as examples in conjunction with the accompanying drawings, and the detailed description is as follows.

In the figures: 100. Explosion-proof tire hub; 10. Hub body; 11, Central axis; 12. Bent portion; 20. Vacuum tire; 30. Explosion-proof convex retainer; 31. Mounting groove; 32. Elastic component; 33. Vent hole; 301. Contact portion; 302. Arc-shaped portion; 303. Rib.

DESCRIPTION OF EMBODIMENTS

The present invention will be further described below with reference to the accompanying drawings and specific embodiments. It should be noted that all embodiments described below or all the technical features can be arbitrarily combined to form new embodiments, provided that no conflict occurs.

It should be noted that when a component is referred to as "fixed" to another component, it may be directly on another component or there may be an intermediate component. When a component is considered to be "connected" to another component, it may be directly connected to another component or an intermediate component may exist at the same time. When a component is considered to be "arranged" on another component, it may be directly arranged on another component or there may be an intermediate component at the same time. As used herein, the terms "vertical", "horizontal", "left", "right" and similar expressions are for illustrative purposes only.

Unless otherwise defined, all technical and scientific terms used herein have the same meanings as those commonly understood by those skilled in the art to which the present invention belongs. The terms used in the specification of the present invention are merely for the purpose of describing specific embodiments, but are not intended to limit the present invention. The term "and/or" used herein includes any and all combinations of one or more related listed items.

Figure 1:
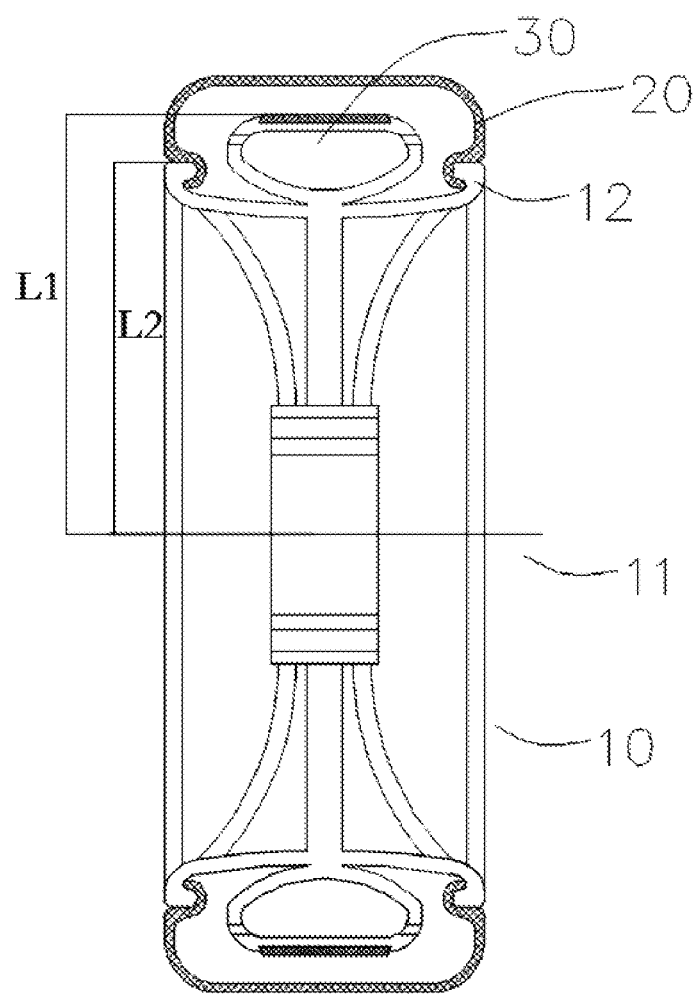
FIG. 1 is a diagram of an internal structure of a preferred embodiment of an explosion-proof tire hub according to the present invention.
Figure 2:
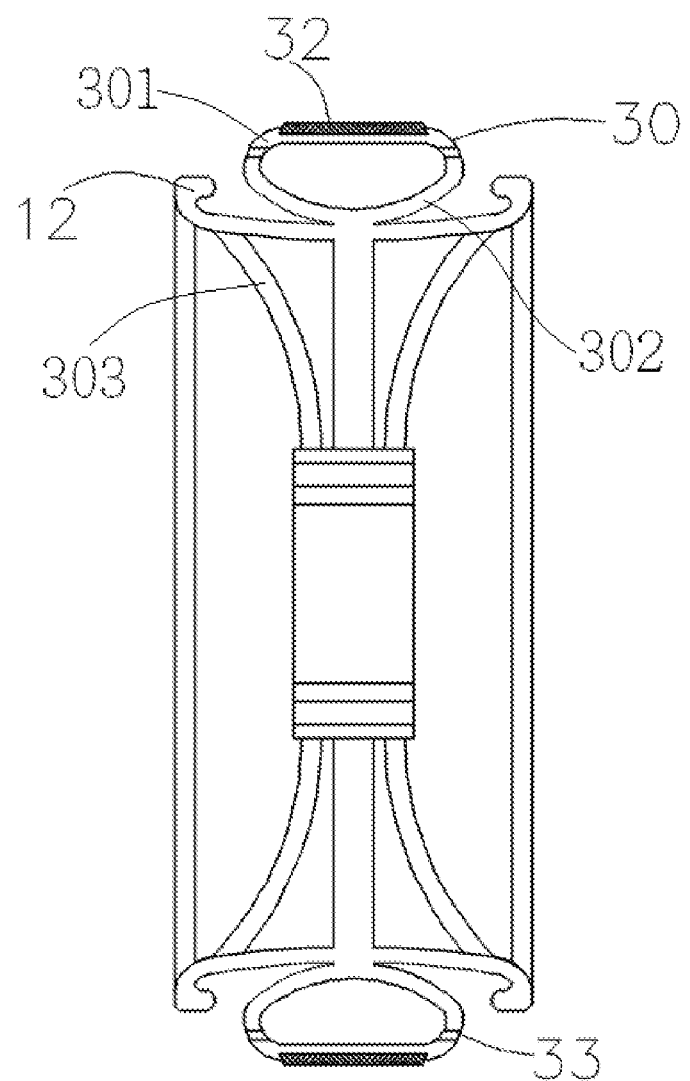
FIG. 2 is a partial structural diagram of the explosion-proof tire hub shown in FIG. 1.
Figure 3:
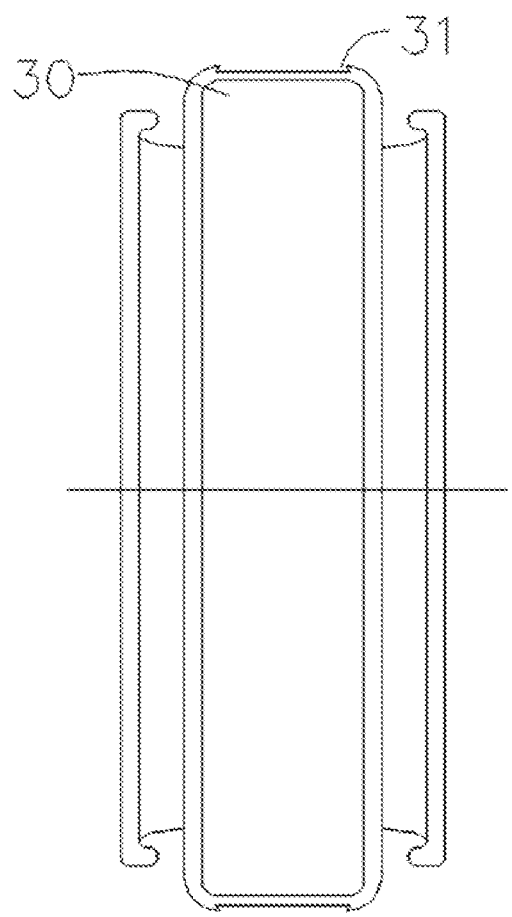
FIG. 3 is another partial structural diagram of the explosion-proof tire hub shown in FIG. 1.
Figure 4:
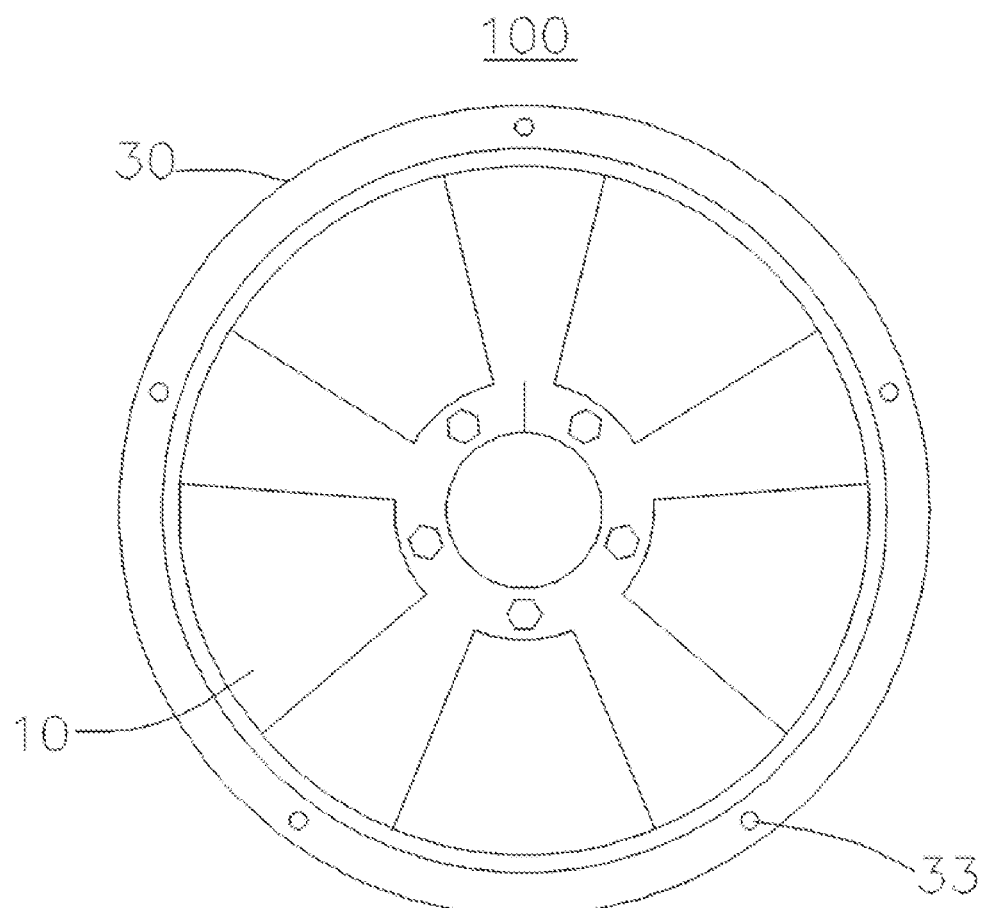
FIG. 4 is a side view of the explosion-proof tire hub shown in FIG. 1.

Referring to FIGS. 1 to 4, an explosion-proof tire hub 100 includes a hub body 10 and an explosion-proof convex retainer 30, where the hub body 10 includes bent portions 12 that are distributed on both sides of the hub body 10 and configured to mount a vacuum tire, the hub body 10 is provided with a central axis 11, the explosion-proof convex retainer 30 is fixed on the hub body 10, the distance between an upper end of the explosion-proof convex retainer 30 and the central axis 11 is L1, the distance between an upper end of the bent portion 12 and the central axis 11 is L2, and L1 is greater than L2. In case of burst or instantaneous pressure loss during running of means of transportation such as an airplane and a vehicle, because the distance L1 between the upper end of the explosion-proof convex retainer 30 and the central axis 11 is greater than the distance L2 between the upper end of the bent portion 12 and the central axis 11, the explosion-proof convex retainer 30 reduces the distance between the whole hub and the ground during tire burst; that is, the explosion-proof convex retainer smoothly replaces a tire cover of the tire to be in direct contact with the ground, which improves safety performance, effectively reduces impacts of braking deviation, deviation, braking and the like, and greatly reduces primary and secondary accidents.

Preferably, the explosion-proof convex retainer 30 is located at a middle portion of the hub body 10 and between the bent portions 12, the cross section of the explosion-proof convex retainer 30 includes a contact portion 301 located outside and an arc-shaped portion 302 located inside, the arc-shaped portion 302 is connected to the contact portion 301, and the lowermost end of the arc-shaped portion 302 is fixed to the middle portion of the hub body 10. The bent portions 12 are symmetrically distributed relative to the explosion-proof convex retainer 30, the bent portions 12 and the explosion-proof convex retainer 30 are arranged around the hub body 10, and the central axis 11 coincides with axes of the bent portion 12 and the explosion-proof convex retainer 30, which improves the stability of the whole structure. A lower portion of the arc-shaped portion 302 forms a mounting gap with the hub body 10.

Preferably, the explosion-proof convex retainer 30 is hollow and is provided with vent holes 33, the vent holes 33 enable the inside of the explosion-proof convex retainer 30 to be communicated with an inner cavity of the vacuum tire, ribs 303 are arranged on both sides of the explosion-proof convex retainer 30, and the ribs 303 on both sides and the hub body 10 are distributed in a triangle shape. The air storage capacity of the whole tire is increased, and the original capacity of the tire is kept. For example, in practice, there are two types of tire pressures: For low-pressure tires, the inflation pressure is 0.1471-0.490 MPa (1.5-5 kg/cm$^2$); the low-pressure tires are generally suitable for private cars; and the inflation tire pressure of family cars is generally 0.2-0.25 MPa. For high-pressure tires, the inflation pressure is 0.5-0.7 MPa (5-7 kg/cm$^2$), and the high-pressure tire is suitable for large goods/passenger vehicles, the inflation pressure is generally about 0.5 MPa, and the inflation pressure of a radial tire can be appropriately increased to about 0.6 MPa. Reasonable air storage capacity and tire pressure are very important for the whole tire. In the present application, the inside of the explosion-proof convex retainer 30 is communicated with the inner cavity of the vacuum tire through the vent holes 33, which prevents the explosion-proof convex retainer 30 from occupying excessive space inside the tire, and improves the applicability of the whole tire on the basis of ensuring reasonable tire pressure and air storage capacity. Specifically, the vent holes 33 pass through the explosion-proof convex retainer 30, and are formed in the explosion-proof convex retainer 30 in a surrounding manner, and the distance between the vent hole 33 and the central axis 11 is greater than the diameter of the hub body 10.

Preferably, the explosion-proof convex retainer 30 includes an elastic component 32, the elastic component 32 is located at an end of the explosion-proof convex retainer 30, and the distance between the elastic component 32 and the central axis 11 is L1. In this embodiment, the elastic component 32 is a rubber retainer; in other embodiments, the elastic component 32 may be made of other elastic materials, and is configured to buffer the impact on the ground, reduce the impact of metal on the ground and further improve the safety performance.

Preferably, the explosion-proof convex retainer 30 is further provided with a mounting groove 31, the elastic component 32 is fixed in the mounting groove 31, the cross section of the mounting groove 31 and the elastic component 32 are trapezoidal, the thickness of the elastic component 32 is greater than the depth of the mounting groove 31, and the cross section of the elastic component 32 is parallel to the cross section of the vacuum tire. The explosion-proof tire hub is novel in structure, ingenious in design, high in applicability and convenient to popularize.

An explosion-proof tire includes a hub body 10, a vacuum tire 20, and an explosion-proof convex retainer 30, where the hub body 10 includes bent portions 12 that are distributed on both sides of the hub body 10, the vacuum tire 20 is mounted on the bent portions 12, the hub body 10 is provided with a central axis 11, the explosion-proof convex retainer 30 is fixed on the hub body 10, the distance between an upper end of the explosion-proof convex retainer 30 and the central axis 11 is L1, the distance between an upper end of the bent portion 12 and the central axis 11 is L2, and L1 is greater than L2. In case of burst or instantaneous pressure loss during running of means of transportation such as an airplane and a vehicle, because the distance L1 between the upper end of the explosion-proof convex retainer 30 and the central axis 11 is greater than the distance L2 between the upper end of the bent portion 12 and the central axis 11, the explosion-proof convex retainer 30 reduces the distance between the whole hub and the ground during tire burst; that is, the explosion-proof convex retainer smoothly replaces a tire cover of the tire to be in direct contact with the ground, which improves safety performance, effectively reduces impacts of braking deviation, deviation, braking and the like, and greatly reduces primary and secondary accidents. Specifically, the explosion-proof convex retainer 30 is hollow and is provided with vent holes 33, the vent holes 33 enable the inside of the explosion-proof convex retainer 30 to be communicated with an inner cavity of the vacuum tire 20, and the vent holes 33 are circular holes; the explosion-proof convex retainer 30 is further provided with a mounting groove 31, an elastic component 32 is fixed in the mounting groove 31, the vent holes 33 are distributed in the explosion-proof convex retainer 30 in a penetrating manner, and axes of the vent holes 33 are parallel to the elastic component 32; and the hub body 10 is located at inner sides of several vent holes 33.

A moving tool includes the above explosion-proof tire hub or the above explosion-proof tire, where the above explosion-proof tire hub or the above explosion-proof tire can be applied to moving tools such as vehicles, airplanes, and motorcycles.

The foregoing embodiments are only the preferred embodiments of the present invention, and cannot be used to limit the protection scope of the present invention. Any immaterial changes and replacements made by those skilled in the art on the basis of the present invention fall within the scope claimed by the present invention.

What is claimed is:

1. An explosion-proof tire hub, comprising a hub body and an explosion-proof convex retainer, wherein the hub body comprises bent portions that are distributed on both sides of the hub body and configured to mount a vacuum tire, the hub body is provided with a central axis, the explosion-proof convex retainer is fixed on the hub body, the distance between an upper end of the explosion-proof convex retainer and the central axis is L1, the distance between an upper end of the bent portion and the central axis is L2, and L1 is greater than L2; and wherein the explosion-proof convex retainer is hollow and is provided with vent holes, the vent holes enable the inside of the explosion-proof convex retainer to be communicated with an inner cavity of the vacuum tire, ribs are arranged on both sides of the explosion-proof convex retainer, and the ribs on both sides and the hub body are distributed in a triangle shape.

2. The explosion-proof tire hub according to claim 1, wherein the explosion-proof convex retainer is located at a middle portion of the hub body and between the bent portions, the cross section of the explosion-proof convex retainer comprises a contact portion located outside and an arc-shaped portion located inside, the arc-shaped portion is connected to the contact portion, and the lowermost end of the arc-shaped portion is fixed to the middle portion of the hub body.

3. The explosion-proof tire hub according to claim 2, wherein the bent portions are symmetrically distributed relative to the explosion-proof convex retainer, the bent portions and the explosion-proof convex retainer are arranged around the hub body, the central axis coincides with axes of the bent portion and the explosion-proof convex retainer, and a lower portion of the arc-shaped portion forms a mounting gap with the hub body.

4. The explosion-proof tire hub according to claim 1, wherein the vent holes pass through the explosion-proof convex retainer, and are formed in the explosion-proof convex retainer in a surrounding manner, and the distance between the vent hole and the central axis is greater than the diameter of the hub body.

5. The explosion-proof tire hub according to claim 1, wherein the explosion-proof convex retainer comprises an elastic component, the elastic component is located at an end of the explosion-proof convex retainer, and the distance between the elastic component and the central axis is L1.

6. The explosion-proof tire hub according to claim 5, wherein the explosion-proof convex retainer is further provided with a mounting groove, the elastic component is fixed in the mounting groove, the cross section of the mounting groove and the elastic component are trapezoidal, the thickness of the elastic component is greater than the depth of the mounting groove, and the cross section of the elastic component is parallel to the cross section of the vacuum tire.

7. A moving tool, comprising the explosion-proof tire hub according to claim 1.

8. An explosion-proof tire, comprising a hub body, a vacuum tire, and an explosion-proof convex retainer, wherein the hub body comprises bent portions that are distributed on both sides of the hub body, the vacuum tire is mounted on the bent portions, the hub body is provided with a central axis, the explosion-proof convex retainer is fixed on the hub body, the distance between an upper end of the explosion-proof convex retainer and the central axis is L1, the distance between an upper end of the bent portion and the central axis is L2, and L1 is greater than L2; and wherein the explosion-proof convex retainer is hollow and is provided with vent holes, the vent holes enable the inside of the explosion-proof convex retainer to be communicated with an inner cavity of the vacuum tire, and the vent holes are circular holes; the explosion-proof convex retainer is further provided with a mounting groove, an elastic component is fixed in the mounting groove, the vent holes are distributed in the explosion-proof convex retainer in a penetrating manner, and axes of the vent holes are parallel to the elastic component; and the hub body is located at inner sides of several vent holes.

9. An explosion-proof tire hub, comprising a hub body and an explosion-proof convex retainer, wherein the hub body comprises bent portions that are distributed on both sides of the hub body and configured to mount a vacuum tire, the hub body is provided with a central axis, the explosion-proof convex retainer is fixed on the hub body, the distance between an upper end of the explosion-proof convex retainer and the central axis is L1, the distance between an upper end of the bent portion and the central axis is L2, and L1 is greater than L2;

wherein the explosion-proof convex retainer is located at a middle portion of the hub body and between the bent portions, the cross section of the explosion-proof convex retainer comprises a contact portion located outside and an arc-shaped portion located inside, the arc-shaped portion is connected to the contact portion, and the lowermost end of the arc-shaped portion is fixed to the middle portion of the hub body;

wherein the bent portions are symmetrically distributed relative to the explosion-proof convex retainer, the bent portions and the explosion-proof convex retainer are arranged around the hub body, the central axis coincides with axes of the bent portion and the explosion-proof convex retainer, and a lower portion of the arc-shaped portion forms a mounting gap with the hub body.

\* \* \* \* \*